United States Patent
Yajima

(10) Patent No.: US 10,474,886 B2
(45) Date of Patent: Nov. 12, 2019

(54) MOTION INPUT SYSTEM, MOTION INPUT METHOD AND PROGRAM

(71) Applicant: Rakuten, Inc., Tokyo (JP)

(72) Inventor: Atsushi Yajima, Tokyo (JP)

(73) Assignee: Rakuten, Inc., Tokyo (JP)

( * ) Notice: Subject to any disclaimer, the term of this patent is extended or adjusted under 35 U.S.C. 154(b) by 138 days.

(21) Appl. No.: 15/503,404

(22) PCT Filed: Aug. 13, 2014

(86) PCT No.: PCT/JP2014/071400
§ 371 (c)(1),
(2) Date: Jul. 11, 2017

(87) PCT Pub. No.: WO2016/024349
PCT Pub. Date: Feb. 18, 2016

(65) Prior Publication Data
US 2017/0300745 A1    Oct. 19, 2017

(51) Int. Cl.
*G06K 9/00* (2006.01)
*G06T 7/20* (2017.01)
(Continued)

(52) U.S. Cl.
CPC ..... *G06K 9/00422* (2013.01); *G06F 17/2735* (2013.01); *G06K 9/00355* (2013.01);
(Continued)

(58) Field of Classification Search
CPC .......... G06K 9/00355; G06K 9/00409; G06K 9/00422; G06T 7/20; G06F 3/04883; G06F 17/2735
See application file for complete search history.

(56) References Cited

U.S. PATENT DOCUMENTS 5,754,686 A *  5/1998  Harada ............... G06K 9/6255
                                                     382/187
6,052,482 A    4/2000  Arai et al.
(Continued)

FOREIGN PATENT DOCUMENTS

EP    2746899 A1    6/2014
JP    H09-190505 A  7/1997
(Continued)

OTHER PUBLICATIONS

Machine translation of JP 2013-242768.*
(Continued)

*Primary Examiner* — Katrina R Fujita
(74) *Attorney, Agent, or Firm* — HEA Law PLLC

(57) ABSTRACT

To prevent an inconvenience from being generated when a user registers a graphic that the user wants to register. A graphic input device obtains registered graphic data indicating a graphic entered by a user and related information associated with the graphic, calculates similarity between the registered graphic data and one of items of graphic data registered in a dictionary, determines whether the entered graphic and a graphic indicated by the item of graphic data is similar to each other based on the calculated similarity, and, in a case where the entered graphic and the graphic indicated by the item of graphic data is not similar to each other, registers the registered graphic data and the related information in the dictionary in association with each other.

10 Claims, 10 Drawing Sheets

(51) Int. Cl.
*G06F 17/27* (2006.01)
*G06F 3/0488* (2013.01)

(52) U.S. Cl.
CPC ............ *G06K 9/00409* (2013.01); *G06T 7/20* (2013.01); *G06F 3/04883* (2013.01)

(56) References Cited

U.S. PATENT DOCUMENTS

| | | | |
|---|---|---|---|
| 6,404,438 B1 * | 6/2002 | Hatlelid | G06F 3/033 345/473 |
| 7,904,837 B2 * | 3/2011 | Wakai | G06F 9/451 715/863 |
| 2007/0098263 A1 * | 5/2007 | Furukawa | G06F 3/03545 382/181 |
| 2014/0152557 A1 | 6/2014 | Yamamoto et al. | |

FOREIGN PATENT DOCUMENTS

| | | |
|---|---|---|
| JP | 2003-076991 A | 3/2003 |
| JP | 2005-071208 A | 3/2005 |
| JP | 2012-098905 A | 5/2012 |
| JP | 2013-065112 A | 4/2013 |
| JP | 2013-242768 A | 12/2013 |

OTHER PUBLICATIONS

Machine translation of JP 2005-071208.*
English translation of the International Search Report for PCT/JP2014/071400.
Partial Translation of Office Action dated Jun. 16, 2017, for corresponding JP application No. 2015-516310.
Search Report dated Jun. 25, 2018, for corresponding EP Patent Application No. 14899908.9.

* cited by examiner

FIG.3

| ID | FEATURE DATA | RELATED INFORMATION | SIMILARITY CRITERION |
|---|---|---|---|
| 1101 | (4,60), (10,32), (13,4), ⋯ | Volcano | 70 |
| 1102 | (4,30), ⋯ | n | 70 |
| ⋮ | ⋮ | ⋮ | ⋮ |

FIG.6
YOUR GRAPHIC BELOW IS
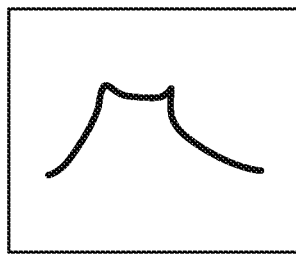 ~37
SIMILAR TO THE ALREADY-REGISTERED GRAPHIC BELOW.
REGISTER ANOTHER GRAHIC.
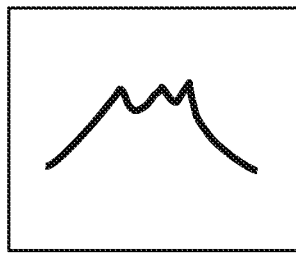 ~38
CONFIRM
39

FIG.8
YOUR GRAPHIC BELOW IS
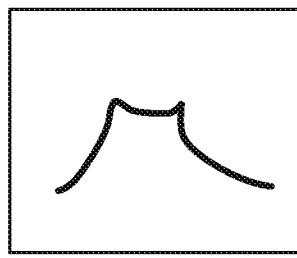
— 41
SIMILAR TO THE ALREADY-REGISTERED GRAPHIC BELOW.
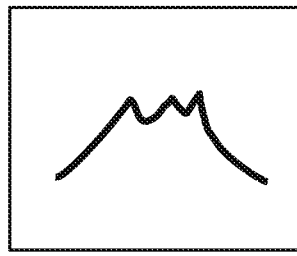
— 42
REGISTER NEW GRAPHIC? [REGISTER] — 43
UPDATE DICTIONARY TO ASSOCIATE SIMILAR GRAPHIC WITH NEW INFORMATION? [UPDATE] — 44
[CANCEL] — 45

MOTION INPUT SYSTEM, MOTION INPUT METHOD AND PROGRAM

CROSS REFERENCE TO RELATED APPLICATIONS

This application is a National Stage of International Application No. PCT/JP2014/071400 filed on Aug. 13, 2014. The contents of the above document is incorporated herein by reference in its entirety.

TECHNICAL FIELD

The present invention relates to a motion input system, a motion input method, and a program.

BACKGROUND ART

There have been devices that recognize a graphic drawn by a user on a touch screen and a gesture of the user (hereinafter referred to as "motion"), and output characters or character strings, or execute special processing based on the recognized motion. For example, in a case where character strings are output, the devices check a graphic entered by a user with feature information of the graphic previously stored in a dictionary, and output a character string associated with the feature information that is closest to the entered graphic.

Patent Literature 1 discloses a handwritten character string recognizing method for recognizing character strings input by handwriting.

CITATION LIST

Patent Document

Patent Literature 1: JP2012-98905A

SUMMARY OF INVENTION

Technical Problem

For example, there is a case in which a user is simply by drawing a graphic on a touch screen, allowed to input a character string including some characters or to input an instruction. In this case, the device for recognizing motions allows the user to input a motion that the user wants to be recognized, and registers the motion in a dictionary in association with the character string or the instruction, for example.

Here, a motion similar to the motion that the user wants to register may be already registered in the dictionary. In this case, if the desired motion is registered just as it is, some inconvenience may occur when the user causes the device to recognize the motion or the similar motion.

In particular, abilities to reproduce graphics or gestures are different depending on users. A user who has high drawing skills, such as a painter, can draw substantially the same graphic with slight differences if the graphic is simple enough to be registered in a dictionary, for example. On the other hand, for a user who is not good at drawings, drawing substantially the same graphic is difficult even if the graphic is simple enough to be registered in a dictionary. If the judging manner of whether the graphics are the same or similar are equally applied to all the users, the users need to undergo very complicated operations not only when registering the graphic in the dictionary but also when outputting the character string.

One or more embodiments of the present invention have been conceived in view of the above, and an object thereof is to provide a motion input system, a motion input method, and a program that prevent an inconvenience from being generated when a user registers a motion that the user wants to register.

Solution to Problem

In order to solve the above described problems, a motion input system according to the present invention includes information processing means for registering a registered motion in association with registration information, and, in response to a user's motion, executing information processing according to the registration information associated with the registered motion similar to the user's motion, receiving means for receiving a new motion and new information associated with the new motion, the new motion and the new information being to be newly registered in the information processing means, determining moans for determining whether the new motion received by the receiving means is similar to the registered motion registered in the information processing means, and registration processing means for executing different processing depending on a determination of the determining means so as to register, in the information processing means, the new motion received by the receiving means and the new information.

A motion input method according to the present invention includes the steps of executing, in response to a registered motion, which is registered in association with registration information, and a user's motion, information processing according to the registration information associated with the registered motion similar to the user's motion, receiving a new motion and new information associated with the new motion, the new motion and the new information being to be newly registered in order to execute the information processing, determining whether the received new motion is similar to the registered motion, and executing different processing depending on whether the new motion is similar to the registered motion so as to register the received new motion and the new information.

A program according to the present invention causes a computer to execute processing of executing, in response to a registered motion, which is registered in association with registration information, and a user's motion, information processing according to the registration information associated with the registered motion similar to the user's motion, receiving a new motion and new information associated with the new motion, the new motion and the new information being to be newly registered in order to execute the information processing, determining whether the received new motion is similar to the registered motion, and executing different processing depending on whether the new motion is similar to the registered motion so as to register the received new motion and the new information.

The present invention may prevent the occurrence of inconvenience when a user registers an operation in association with information.

In an aspect of the present invention, the motion input device may further include notifying means for notifying the user when the determining means determines that the new motion received by the receiving means is similar to the registered motion registered in the information processing means.

In an aspect of the present invention, in a case where it is determined that the new motion received by the receiving means is similar to the registered motion registered in the information processing means, the registration means may register the new motion and the new information, and change a determination criterion for determining whether the new motion is similar to the user's motion.

In an aspect of the present invention, in a case where it is determined that the new motion received by the receiving means is similar to the registered motion registered in the information processing means, the registration means may register the registered motion determined to be similar to the new motion in association with the new information.

In an aspect of the present invention, in response to a processing condition and the user's motion where the processing condition is associated with the registration information, the information processing means may execute information processing according to the registration information that satisfies the processing condition and is associated with the registered motion similar to the user's motion.

BRIEF DESCRIPTION OF DRAWINGS

FIG. 3 a diagram illustrating an example of data stored in a dictionary storing unit;

FIG. 6 is a diagram illustrating an example of a message that is output when there is a similar graphic;

FIG. 8 is a diagram illustrating another example of a message that is output when there is a similar graphic;

DESCRIPTION OF EMBODIMENTS

Figure 1:
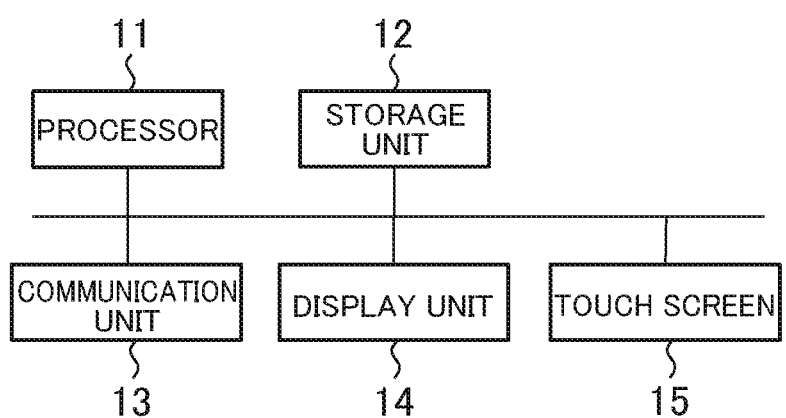
FIG. 1 is a diagram illustrating an example of a hardware configuration of a graphic recognizing device according to an embodiment of the present invention.

An embodiment of the present invention will be described below in detail with reference to the accompanying drawings. Elements that are the same or equivalent are labeled with the same reference numerals, and their overlapping explanation may be omitted. This embodiment focuses on drawing a graphic as an input operation of a user. A graphic recognizing device according to this embodiment allows a user to input a graphic on a touch screen as a motion, for example, and recognizes the graphic. In the following, the graphic recognizing device will be described, although the graphic recognizing device may actually be a system including multiple devices.

Graphics include a handwritten character or symbol. A method for recognizing a handwritten character or symbol may be so-called on-line handwriting recognition method or off-line handwriting recognition method. The on-line handwriting recognition method is a method for recognizing a character or a symbol by using information including an order of drawing lines. The off-line handwriting recognition method is a method for recognizing a character or a symbol based on an image drawn by a user, and an order of drawing lines is not used in this method.

FIG. 1 is diagram illustrating an example of a hardware configuration of the graphic recognizing device. The graphic recognizing device includes a processor 11, a storage unit 12, a communication unit 13, a display unit 14, and an input unit 15. The graphic recognizing device is, for example, a tablet terminal or a personal computer.

The processor 11 operates according to a program stored in the storage unit 12. The processor 11 controls the communication unit 13, the display unit 14, and the input unit 15. The program may be provided via the internet or by being stored in a computer-readable storage medium, such as a flash memory or a DVD-ROM.

The storage unit 12 includes a memory device, such as a RAM and a flash memory, and a hard disk drive. The storage unit 12 stores the program. The storage unit 12 also stores information and computational results from each unit.

The communication unit 13 provides functions to communicate with other devices, and includes an integrated circuit of a wireless LAN and a connector terminal, for example. The communication unit 13 inputs information received from other devices into the processor 11 and the storage unit 12, and sends information to other devices under the control or the processor 11.

The display unit 14 is a display output device (display means), such as a liquid crystal panel, and a circuit that controls the display output device, and is constituted by a liquid crystal display panel and a graphic chip. The display unit 14 outputs an image to the display output device under the control of the processor 11. A document processing apparatus may not necessarily include a display output device, and the display unit 14 may get an external display output device to display an image.

The input unit 15 includes an input device, such as a touch screen, and a controller for obtaining data from the input device, such as a keyboard and a mouse. The input unit 15 obtains a motion and data, which are entered when a user operates a touch screen or an input device, based on the control of the processor 11. In this embodiment, the graphic recognizing device includes a display panel with a built-in touch screen, in which a display output device and a touch screen are integrated.

Figure 2:
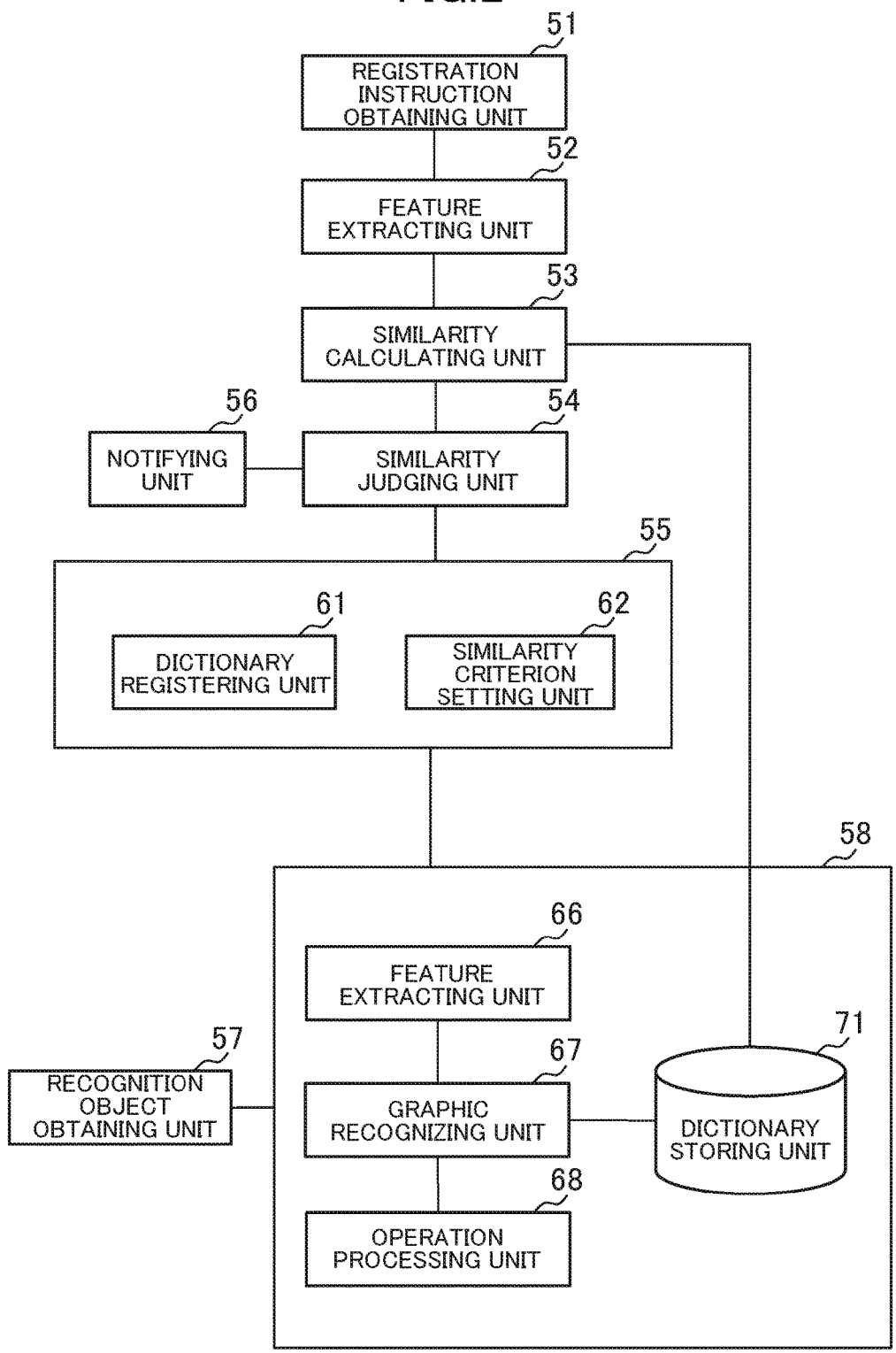
FIG. 2 is a block diagram illustrating functions implemented in the graphic recognizing device.

FIG. 2 is a block diagram illustrating functions implemented in the graphic recognizing device. The graphic recognizing device functionally includes a registration instruction obtaining unit 51, a feature extracting unit 52, a similarity calculating unit 53, a similarity judging unit 54, a registering unit 55, a notifying unit 56, a recognition object obtaining unit 57, and a recognition processing unit 58. These functions are provided when the processor 11 executes a program stored in the storage unit 12, and the communication unit 13 controls the display unit 14 and the input unit 15. The registering unit 55 functionally includes a dictionary registering unit 61 and a similarity criterion setting unit 62. The recognition processing unit 58 functionally includes a feature extracting unit 66, a graphic recognizing unit 67, an operation processing unit 68, and a dictionary storing unit 71.

The recognition processing unit 58 registers feature data indicating motions and related information associated with the feature data. Here, the feature data is data indicating features of graphics including characters and symbols. The related information is an instruction executed for a character string or a motion as a start-up trigger.

The dictionary storing unit 71 included in the recognition processing unit 58 is mainly implemented in the storage unit 12. The dictionary storing unit 71 stores dictionary data, which is registered in the recognition processing unit 58 and includes items of feature data and items of related information that are respectively associated with the items of feature data.

FIG. 3 is a diagram illustrating an example of data stored in the dictionary storing unit 71. The dictionary storing unit 71 stores, for example, feature data, related information, and a similarity range. The feature data shown in FIG. 3 is information about feature points indicating features of graphics in the lines being drawn. FIG. 3 indicates an example of on-line handwriting recognition. The similarity criterion is information used as a criterion for judging similarity when a graphic is recognized, and will be described later in details. Although not shown here, the dictionary data may further include image data of graphics in association with the feature data.

In a case of off-line handwriting recognition, the feature data may be, for example, a feature vector having a plurality of dimensions. The feature vector includes, for example, the number of elements obtained by multiplying the number of sub-areas of the divided graphic by four. In a case where the sub-areas are obtained by dividing an area of the graphic into 64 areas, the number of dimensions of the feature vector is 256. Each sub-area has four feature values that indicate whether such a sub-area includes lines in a vertical direction, a horizontal direction, and two oblique directions, and each of elements of the feature vector has the feature values.

Figure 4:
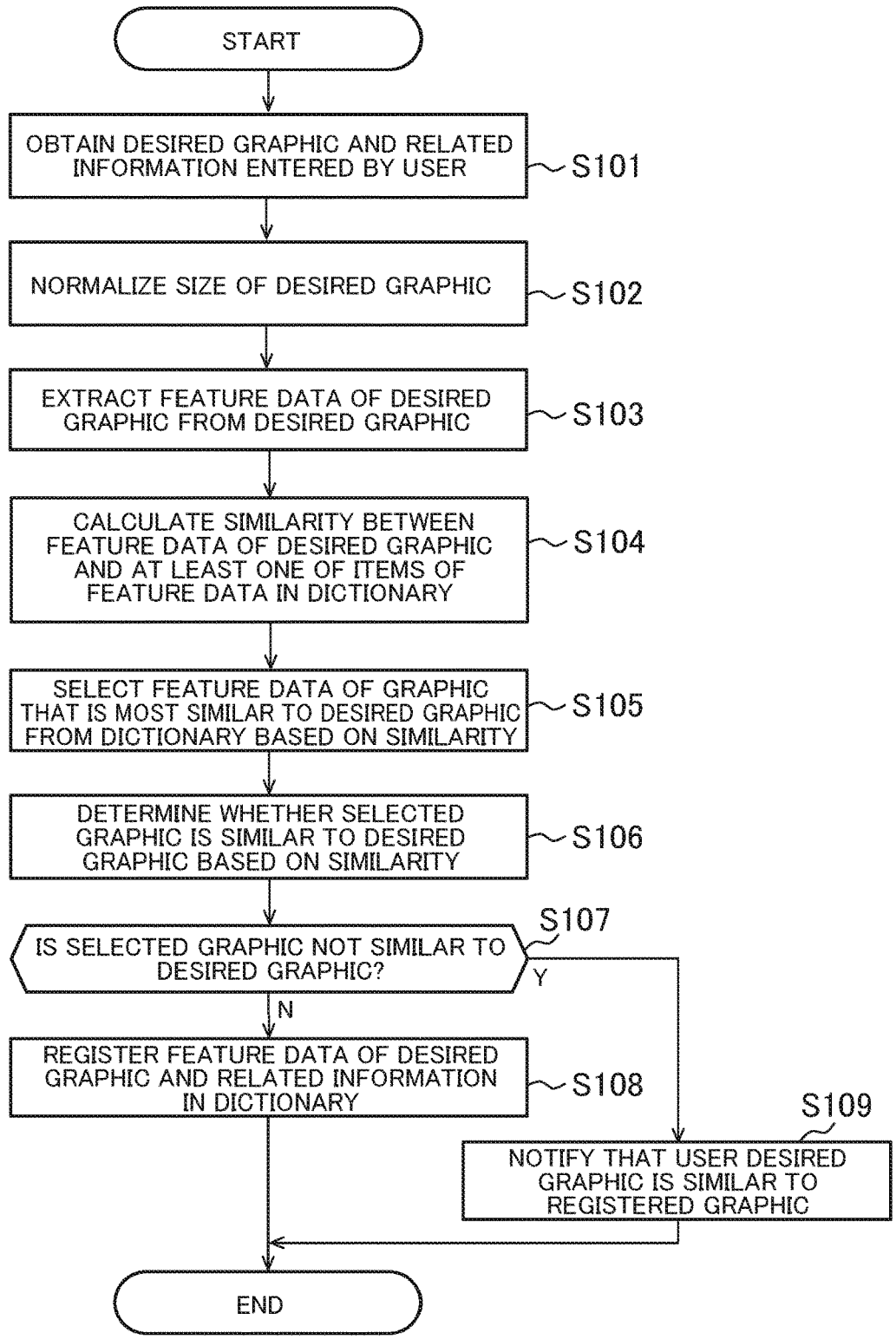
FIG. 4 is a flow chart illustrating an example of processing of a registration instruction obtaining unit, a feature extracting unit, a similarity calculating unit, a similarity judging unit, a registering unit, and a notifying unit.

Next, the processing for registering a graphic in the graphic recognizing device by a user will be described. FIG. 4 is a flow chart illustrating an example of processing of a registration instruction obtaining unit 51, a feature extracting unit 52, a similarity calculating unit 53, a similarity judging unit 54, a registering unit 55, and a notifying unit 56. In the following, referring to the flow chart in FIG. 4, functions of the registration instruction obtaining unit 51, the feature extracting unit 52, the similarity calculating unit 53, the similarity judging unit 54, the registering unit 55, and the notifying unit 56 will be described.

The registration instruction obtaining unit 51 is implemented mainly in the processor 11, the storage unit 12, the display unit 14, and the input unit 15. The registration instruction obtaining unit 51 receives a new motion and new related information to be associated with the new motion, each to be newly registered in the registering unit 55. More specifically, the registration instruction obtaining unit 51 obtains data of a desired graphic, which is a graphic that a user wants to register and is entered by the user, and related information to be associated with the desired graphic (step S101). The registration instruction obtaining unit 51 obtains data of a graphic drawn by the user within an area on the touch screen of the input unit 15 using a stylus or a finger as data of the desired graphic. The data of the desired graphic is of the same kind as data of a graphic obtained when the graphic is recognized. The data of the desired graphic may include information about motions and stroke orders of the stylus when the graphic is drawn, for example, or simple image data of the graphic. Further, the registration instruction obtaining unit 51 obtains character string information entered by the user through the input unit 15, for example, and obtains the character string information as related information.

Figure 5:
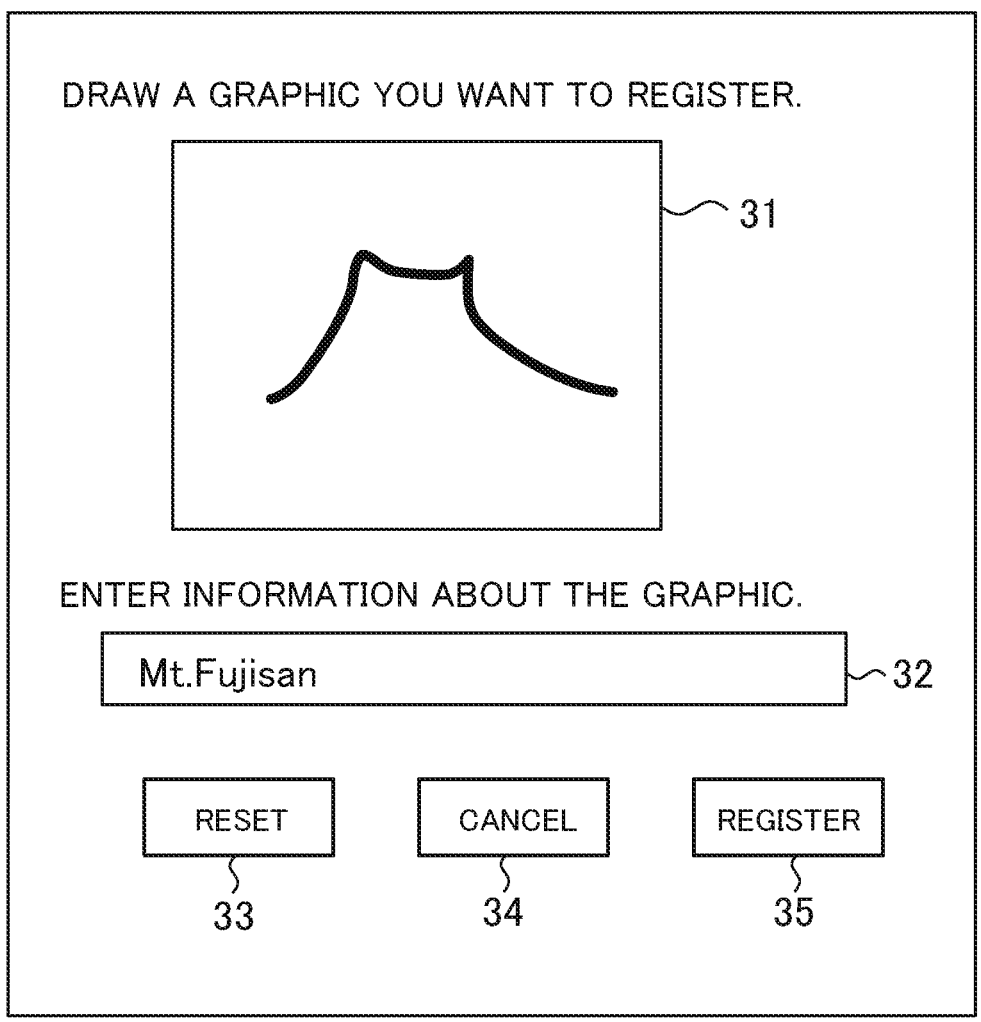
FIG. 5 is a diagram illustrating an example of a registration information input screen.

FIG. 5 is a diagram illustrating an example of a registration information input screen displayed by the registration instruction obtaining unit 51. The registration information input screen includes a graphic input area 31, a character string input area 32, a reset button 33, a cancel button 34, and a registration button 35. The graphic input area 31 is an area in which a user inputs a desired graphic that the user wants to register and the graphic entered by the user is drawn. The character string input area 32 is an area to input a character string that is to be associated with the desired graphic as related information. The reset button 33 is a button to clear the entered graphic. When the registration button 35 is pressed, the registration instruction, obtaining unit 51 obtains data of the desired graphic entered in the graphic input area 31 and the related information entered in the character string input area 32. The related information may be information that associates the graphic with an instruction to cause a program to perform some motions. A user may not necessarily input related information each time. For example, in a case where the registration information input screen displays previously entered related information and then the registration button 35 is pressed, the registration instruction obtaining unit 51 may obtain the previously entered related information.

The feature extracting unit 52 is implemented mainly in the processor 11 and the storage unit 12. The feature extracting unit 52 normalizes the size of the desired graphic (step S102), and extracts feature data, which indicates features of the desired graphic, from data of the normalized desired graphic (step S103). The feature data may be a list of feature points extracted from the desired graphic in order, or a predetermined dimensional feature vector. The method by which the feature extracting unit 52 extracts feature data is known, and accordingly the detailed description is omitted.

The similarity calculating unit 53 is implemented mainly in the processor 11 and the storage unit 12. The similarity calculating unit 53 calculates the similarity between the feature data of the desired graphic and at least one of items of feature data registered in the dictionary (step S104), thereby calculating the similarity between the desired graphic and one of the graphics registered in the dictionary. The method for calculating the similarity between the feature data of the desired graphic and the feature data registered in the dictionary may use a so-called Hidden Markov Model, a DP matching method, or calculation of a distance between feature vectors. When the Hidden Markov Model is used, the probability of being calculated corresponds to the similarity.

The similarity judging unit 54 is implemented mainly in the processor 11 and the storage unit 12. The similarity judging unit 54 determines whether the desired graphic is similar to the graphic registered in the dictionary based on the calculated similarity. Specifically, the similarity judging unit 54 selects feature data of a graphic that is most similar to the desired graphic among from the feature data registered in the dictionary based on the similarity (step S105), and determines whether the selected graphic is similar to the desired graphic based on the similarity between the selected feature data and the feature data of the desired graphic (step S106). In a case where the larger a value of the similarity, the larger the similarity between two graphics, the similarity judging unit 54 determines, in step S106, that the selected graphic is similar to the desired graphic if the similarity is greater than the predetermined set threshold value, for example.

The registering unit 55 is implemented mainly in the processor 11 and the storage unit 12. The registering unit 55 executes different processing depending on the determination of the similarity judging unit 54 so as to register, in the recognition processing unit 58, the new motion and the new related information received by the registration instruction obtaining unit 51. The processing may include notifying the user by the registering unit 55 when the new motion is similar to the registered motion, changing the determination criterion by which it is determined whether a motion entered by the user is similar to the new motion in a case where the new motion is similar to the registered motion, or registering the motion determined to be similar in association with the new information in the recognition processing unit 58. The processing of the registering unit 55 will be described in details below.

The dictionary registering unit 61 included in the registering unit 55 is implemented mainly in the processor 11 and the storage unit 12. When it is determined that the selected graphic is not similar to the desired graphic (N in step S107), the dictionary registering unit 61 registers the feature data of the desired graphic and the related information in association with each other in the dictionary (step S108).

The notifying unit 56 is implemented mainly in the processor 11, the storage unit 12, and the display unit 14. When it is determined that the selected graphic is similar to the desired graphic (Y in step S107), the notifying unit 56 notify the user that the desired graphic is similar to the graphic registered in the dictionary (step S109).

FIG. 6 is a diagram illustrating an example of a message that is output from the notifying unit 56 to the user when there is a similar graphic. The message screen that the notifying unit 56 displays on the display output device includes an input graphic display area 37, which is an area to display a desired graphic, a similar graphic display area 38, which is an area to display a graphic similar to the desired graphic, and a confirmation button 39.

As described above, the processing for registering the desired graphic and the related information is changed depending on whether it is determined that the motion (feature data extracted from the motion) entered by the user to register and the motion (feature data of the motion) registered already are similar to each other. This configuration prevents the inconvenience that may arise when the user register a motion similar to a motion that has been registered already.

By acknowledging that the motion entered by the user is similar to the motion registered already, the user can register another motion that is not similar to the existing motion. Specifically, a graphic similar to the desired graphic is displayed, and thus the user can easily conceive a new desired graphic that is not similar to other graphics.

When a desired graphic is similar to one of graphics in the dictionary, it is not necessary to indiscriminately reject registration of the desired graphic. A user who has high drawing skills, such as a painter, can draw substantially the same graphic with slight differences if the graphic is simple enough to be registered in a dictionary, for example. Such a user can select to reproduce the desired graphic using individual skills based on the existing (registered) similarity criterion, even if the desired graphic is determined to be similar to one of graphics in the dictionary. Needless to say, it is not necessary to reject registration of a desired graphic for other users.

Figure 7:
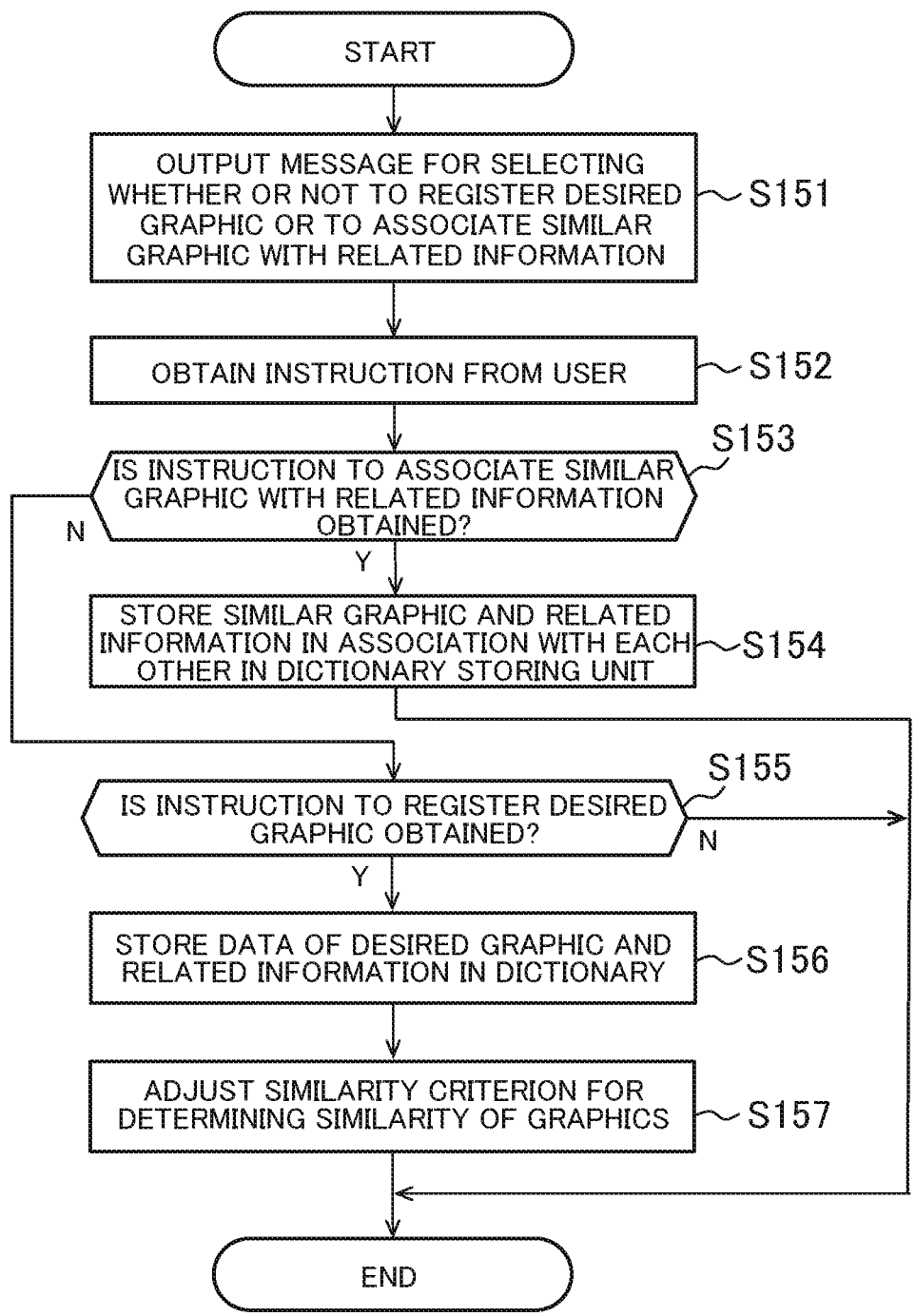
FIG. 7 is a flow chart illustrating another example of processing executed when a desired graphic is similar to one of graphics in the dictionary.

FIG. 7 is a flow chart illustrating another example of processing executed when a desired graphic is similar to one of graphics in the dictionary. The processing of FIG. 7 may be executed in place of step S109 in FIG. 4. When a desired graphic is similar to one of graphics in the dictionary, in the example shown in FIG. 7, the notifying unit 56 outputs a message for the user to select whether to register the desired graphic, to register related information in association with the similar graphic, or not to register the desired graphic and the related information (step S151).

FIG. 8 is a diagram illustrating another example of a message that the notifying unit 56 outputs to a user when there is a similar graphic. The message screen that the notifying unit 56 displays on the display output device includes an input graphic display area 41, which is an area to display a desired graphic, a similar graphic display area 42, which is an area to display a similar graphic, a registration button 43, an update button 44, and a cancel button 45. The registration button 43 is a button for a user to register a desired graphic upon acknowledging there is a similar graphic. The update button 44 is a button for a user to update the dictionary so as to associate the similar graphic with the related information obtained by the registration instruction obtaining unit 51. The cancel button 45 is a button to be pressed when the desired graphic and the related information are determined not to foe registered in the dictionary.

When the user provides an instruction regarding the registration by pressing the registration button 43, for example, the dictionary registering unit obtains the instruction from the user (step S152). When the instruction from the user is an instruction to associate the similar graphic with the related information obtained by the registration instruction obtaining unit 51 (Y in step S153), the dictionary registering unit 61 stores the similar graphic and the related information in association with each other in the dictionary storing unit 11 (step S154). By associating the similar graphic with the related information, it is possible to prevent inconvenience that may be caused by the registration of a new desired graphic, and to input the related information by the user's input of the graphic.

A similar graphic may be associated with multiple items of related information. Multiple items of related information associated with one similar graphic may include related information obtained by the registration instruction obtaining unit 51 and information originally associated with the similar graphic. When the graphic is a character, the information originally associated with the similar graphic may be a code indicating the character.

The dictionary registering unit 61 may store, in the dictionary storing unit 71, data of the desired graphic in association with the related information associated with the similar graphic after step S154. Further, the similar graphic may be associated with the related information obtained by the registration instruction obtaining unit 51.

When the dictionary registering unit 61 does not obtain an instruction to associate the similar graphic with related information (N in step S153), the dictionary registering unit 61 determines whether an instruction to register the desired graphic is obtained (step S155). When the obtained instruction is not an instruction to register the desired graphic (N in step S155), the processing shown in FIG. 7 terminates because an instruction to register nothing is obtained. On the other hand, when the obtained instruction is an instruction to register the desired graphic (Y in step S155), the dictionary registering unit 61 stores data of the desired graphic and the related information in association with each other in the dictionary storing unit 71 (step S156).

The similarity criterion setting unit 62 included in the registering unit 55 is implemented mainly in the processor 11 and the storage unit 12. When it is determined that a new motion that the user wants to register is similar to a motion that is registered already, and the new motion and new related information in association with the new motion are registered, the similarity criterion setting unit 62 changes determination criterion (hereinafter referred to as "similarity criterion"), which is a criterion registered in the recognition processing unit 58 and used for determining whether the new motion is similar to the user's motion. More specifically, when it is determined that the desired graphic is similar to a graphic in the dictionary and data of the desired graphic is registered in the dictionary (after step S156), the similarity criterion setting unit 62 adjusts the similarity criterion for determining the similarity between the graphic entered by the user and the registered graphic based on the similarity between the desired graphic and the graphic included in the dictionary (step S157). The similarity criterion is a threshold value of similarity that determines whether graphics are similar, for example, and is used when a graphic recognizing unit 67 included in the recognition processing unit 58 determines whether the entered graphic is a graphic registered in the dictionary. The similarity criterion may be defined for each user, ox each item of feature data. The similarity criterion is defined such that when a desired graphic and a similar graphic are more similar to each other, a range of the similarity is narrower.

When a user instructs to register a desired graphic even though there is a similar graphic, the user is highly likely confident in his/her ability to input the graphic correctly. As such, there is lower likelihood of issues caused by registering the desired graphic in the dictionary. On the other hand, if the criterion for determining that the graphic entered by the user is similar to the graphic registered in the dictionary is not changed, candidates of graphics that are unnecessary for the user may be displayed. Such possibility can be reduced by changing the similarity criterion.

For example, in the example shown in FIG. 3, a similarity parameter is set for each item of feature data. When a graphic corresponding to an item of dictionary data having ID number of 1101 is a similar graphic, the similarity criterion setting unit 62 changes a similarity parameter of the similar graphic from 70 to 80. With this configuration, the graphic entered at the time of graphic recognition need to be more similar to the similar graphic than ever before in order to recognize the similar graphic as the entered graphic, for example. The similarity criterion may be used when the similarity judging unit 54 determines whether a desired graphic is similar to a graphic in the dictionary.

Figure 9:
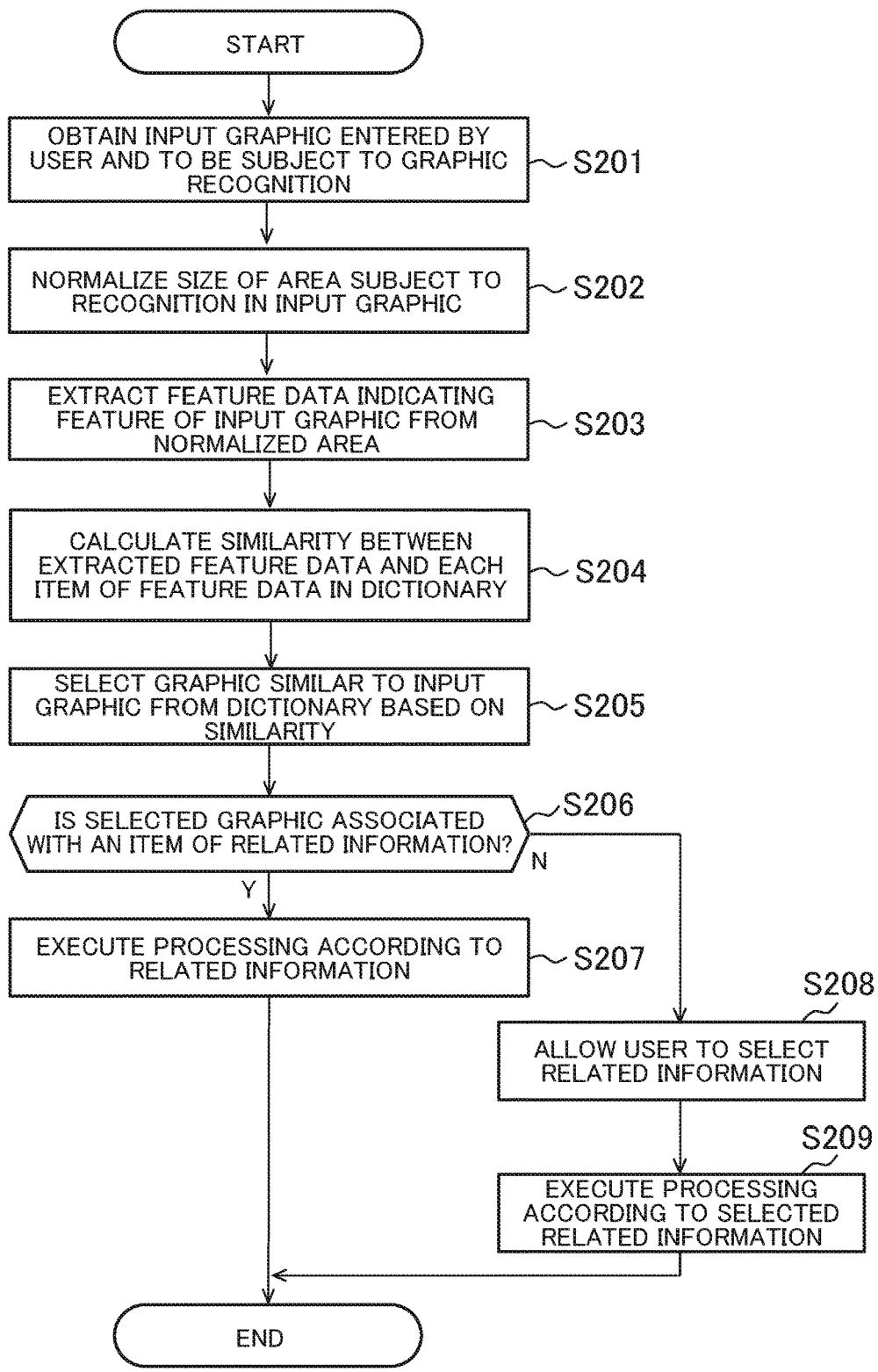
FIG. 9 is a flow chart illustrating an example of processing of a recognition object obtaining unit and a recognition processing unit.

Next, the processing in which the graphic recognizing device recognizes a graphic entered by a user will be described. FIG. 9 is a flow chart illustrating an example of the processing of the recognition object obtaining unit 57 and the recognition processing unit 58. In the following, functions of the recognition object obtaining unit 57 and the recognition processing unit 58 will be described by referring to the processing flow chart in FIG. 9.

The recognition object obtaining unit 57 is implemented mainly in the processor 11, the storage unit 12, the display unit 14, and the input unit 15. The recognition object obtaining unit 57 obtains data of an input graphic, which is a graphic entered by the user and subject to graphic recognition (step S201).

The recognition processing unit 58 is implemented mainly in the processor 11, the storage unit 12, the display unit 14, and the input unit 15. In response to a motion of a user to input a graphic, the recognition processing unit 58 executes information processing according to related information associated with feature data indicating a motion similar to the user's motion.

The feature extracting unit 66 included in the recognition processing unit 58 is implemented mainly in the processor 11 and the storage unit 12. The feature extracting unit 66 normalizes a size of an area subject to the recognition in the input graphic (step S202). The area subject to the recognition is, for example, an area of an input graphic. In a case where multiple graphics (character strings) are entered, the feature extracting unit 65 may cut out an area subject to the recognition for each character. Further, the feature extracting unit 66 extracts feature data indicating features of the input graphic from the data of the normalized input graphic (step S203). The method for extracting the feature data is the same as the method performed by the feature extracting unit 52.

The graphic recognizing unit 67 included in the recognition processing unit 58 is implemented mainly in the processor 11 and the storage unit 12. When the input graphic is similar to one of graphics registered in the dictionary, the graphic recognizing unit 67 outputs related information associated with the one of graphics as a recognition result of the graphic.

More specifically, the graphic recognizing unit 67 calculates similarity between the extracted feature data and each of items of feature data of graphics stored in the dictionary storing unit 71 (registered in the recognition processing unit 58) (step S204). The graphic recognizing unit 67 then selects a graphic similar to the input graphic from the dictionary based on the similarity calculated for the items of feature data (step S205). The method for selecting a similar graphic includes selecting a graphic corresponding to an item of feature data for which the highest similarity is calculated among items of feature data having similarity in the range indicated by the similarity parameter. Alternatively, the graphic recognizing unit 67 may simply select graphics respectively corresponding to items of feature data having similar ivy within the similarity range indicated by the similarity parameter. In this case, an item of feature data registered in the dictionary may be associated with only one item of related information.

Based on a processing condition associated with the related information and a motion of the user, the graphic recognizing unit 67 may output related information, which satisfies the processing condition and is associated with the registered motion similar to the motion of the user. More specifically, the graphic recognizing unit 6 may select a graphic similar to the input graphic from the dictionary based on the similarity and information registered in association with each item of feature data. For example, the graphic recognizing unit 67 may obtain feature data, which satisfies the processing condition associated with feature data in the dictionary and for which similarity higher than the threshold value is calculated. The processing condition may include, for example, start and end dates for identifying Christmas season, terms represented by start and end times, other programs that receive recognized information, and information about whether to output a character code or to input an instruction. For example, the registration instruction obtaining unit 51 may obtain an execution condition from a user, and the dictionary registering unit 61 may register the execution condition in the dictionary.

Using the processing condition enables to, for example, output a Christmas character for a graphic of a tree in the Christmas season, and output a forest bath character in the summer.

The operation processing unit 68 included in the recognition processing unit 58 is implemented mainly in the processor 11, the storage unit 12, and the display unit 14. The operation processing unit 68 executes processing according to related information.

More specifically, when the selected graphic is associated with an item of related information (Y in step S206), the operation processing unit 68 executes the processing according to the item of related information (step S207). More specifically, when the item of related information is a character string, the operation processing unit 68 outputs the character string on the display means, and when the item of related information is an instruction, the operation processing unit 68 executes processing (e.g., processing to start an application program or to delete a character) according to the instruction. When the selected graphic is associated with multiple items of related information (N in step S206), the operation processing unit 68 outputs an image that enables the user to select one of the items of related information through the display unit 14, and to select one of the items of related information through the input unit 15 (step S208). The operation processing unit 68 executes the processing according to the selected related information (step S209).

Figure 10:
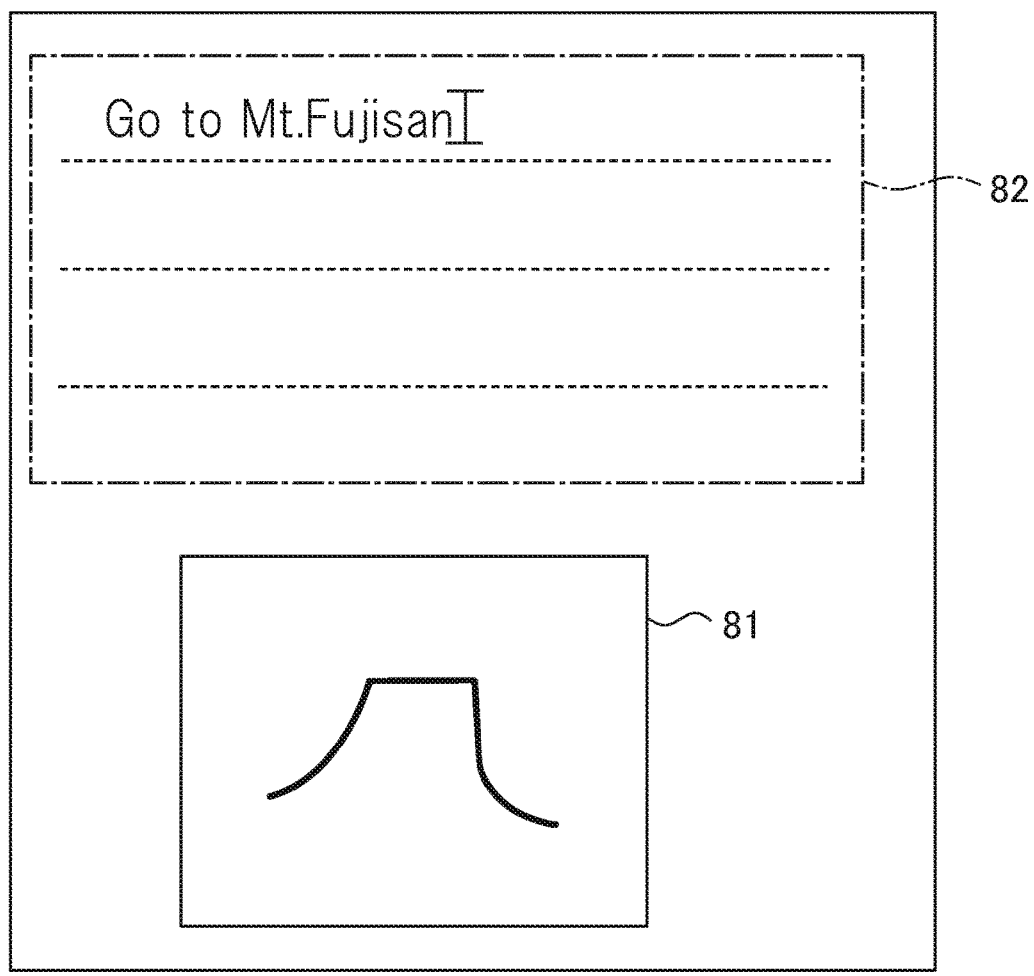
FIG. 10 is a diagram illustrating an example of a screen for inputting a graphic to be a recognition object.

FIG. 10 is a diagram illustrating an example of a screen for inputting a graphic subject to a recognition object. This screen includes a graphic input area 81 and an area to display a character string corresponding to the graphic. In the example of FIG. 10, a graphic entered in the graphic input area 81 is recognized as a graphic registered in the dictionary through the screen shown in FIG. 5, for example, and the character string "Mt. Fujisan" is output, which is related information, on a character string display field 82.

The invention claimed is:

1. A motion input device comprising:
   at least one processor; and
   at least one memory device that stores a plurality of instructions which, when executed by the at least one processor, causes the at least one processor to:
   execute, in response to a user's motion, information processing according to registration information associated with a registered motion similar to the user's motion;
   receive a new motion and new information associated with the new motion, where the new motion and the new information are to be newly registered;
   determine whether a similarity between the received new motion and the registered motion is larger than a threshold; and
   execute, depending on the determination, processing so as to register the received new motion and the new information,
   wherein each motion is a drawing; and
   wherein if the at least one processor determines that the received new motion is similar to the registered motion, the new motion and the new information are registered, and a determination criterion for determining whether the new motion is similar to the user's motion is changed.

2. The motion input device according to claim 1, wherein the at least one processor further notifies the user when the at least one processor determines the received new motion is similar to the registered motion.

3. The motion input device according to claim 1, wherein in response to a processing condition and the user's motion where the processing condition is associated with the registration information, information processing is executed according to the registration information that satisfies the processing condition and that is associated with the registered motion similar to the user's motion.

4. The motion input device according to claim 1 further comprising:
   an input unit for obtaining a motion entered by the user operating the input unit,
   wherein the at least one processor receives, as the new user motion, the motion obtained by the motion input unit.

5. The motion input device according to claim 1,
   wherein the at least one processor obtains a character string entered by the user operating the input unit,
   wherein the at least one processor receives, as the new information, the character string obtained by the input unit, and
   the at least one processor outputs, in response to the user's motion, outputs a registered character string associated with a registered motion similar to the user's motion.

6. The motion input device according to claim 1,
   wherein the at least one processor determines whether the received new motion is similar to the registered motion based on the determination criterion, and
   the at least one processor narrows, as the determination criterion, a range of acceptable similarity to match a new motion to a registered motion, when it has previously been determined that a first registered motion and a second registered motion are similar to each other.

7. The motion input device according to claim 6, wherein the at least one processor defines the range of acceptable similarity, based on a similarity between the first registered motion and the second registered motion.

8. A motion input device comprising:
   at least one processor; and
   at least one memory device that stores a plurality of instructions, which when executed by the at least one processor, causes the at least one processor to:
   execute, in response to a user's motion, information processing according to registration information associated with a registered motion similar to the user's motion;
   receive a new motion and new information associated with the new motion, where the new motion and the new information are to be newly registered;
   determine whether a similarity between the received new motion and the registered motion is larger than a threshold; and
   execute, depending on the determination, processing so as to register the received new motion and the new information,
   wherein each motion is a drawing, and
   wherein if the at least one processor determines that the received new motion is similar to the registered motion, the registered motion is registered in association with the new information.

9. A motion input method comprising the steps of:
   executing, in response to a user's motion, information processing according to registration information associated with a registered motion similar to the user's motion;
   receiving a new motion and new information associated with the new motion, where the new motion and the new information are newly registered;
   determining whether a similarity between the received new motion and the registered motion is larger than a threshold; and executing, depending on the determination, processing so as to register the received new motion and the new information, wherein each motion is a drawing;

wherein if the received new motion is similar to the registered motion, registering the new motion and the new information, and changing a determination criterion for determining whether the new motion is similar to the user's motion.

10. A motion input method comprising the steps of:

executing, in response to a user's motion, information processing according to registration information associated with a registered motion similar to the user's motion;

receiving a new motion and new information associated with the new motion, where the new motion and the new information are newly registered;

determining whether a similarity between the received new motion and the registered motion is larger than a threshold; and executing, depending on the determination, processing so as to register the received new motion and the new information, wherein each motion is a drawing;

wherein if the received new motion is similar to the registered motion, registering the registered motion in association with the new information.

* * * * *